Feb. 25, 1969 SHINICHI HIRATA 3,429,415
TAB PROGRAMMING CONTROL SYSTEM BY MEANS OF CODES
Original Filed March 23, 1966
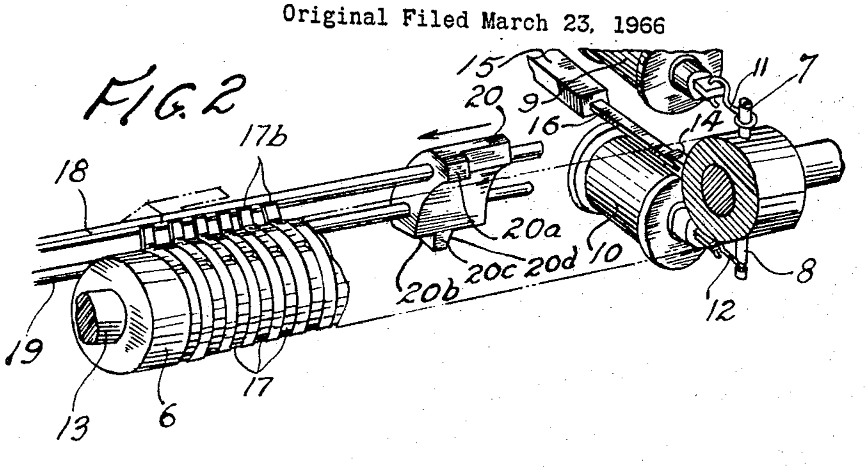
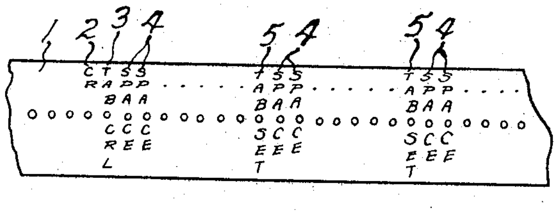
FIG. 1.
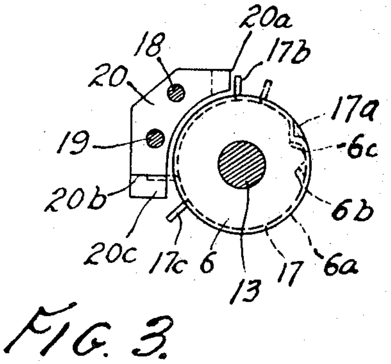
FIG. 3.
INVENTOR
Shinichi Hirata
BY
Burgess, Ryan & Hicks United States Patent Office 3,429,415

Patented Feb. 25, 1969

3,429,415

TAB PROGRAMMING CONTROL SYSTEM BY MEANS OF CODES

Shinichi Hirata, Tokyo, Japan, assignor to Kabushiki Kaisha Ricoh, Tokyo, Japan, a corporation of Japan Continuation of application Ser. No. 536,716, Mar. 23, 1966. This application Oct. 17, 1967, Ser. No. 690,038
U.S. Cl. 197—179 1 Claim
Int. Cl. H04m 1/02, 3/16, 3/18

ABSTRACT OF THE DISCLOSURE

A tab programming control system for a typewriter, coded tape control therefor, an oscillatable tab supporting shaft rotatable to either side of neutral by means of electro-magnets and a longitudinal tab stop member for rotating tabs on the supporting shaft and for acting as a stop for certain tab positioning.

This application is a continuation of applicant's application Ser. No. 536,716, filed Mar. 23, 1966, now abandoned.

In the known business machines such as punch typewriters, programming of tab functions requires a system in which a specially formulated program bar, or a special program tape, or card or disc is made to move in a manner corresponding to printing columns. These systems, however, had drawbacks in that they required cumbersome manual work when mounting and removing the program bars and relevant components.

According to this invention, the tab programming is controlled by means of special function codes consisting of tab-setting and tab-clearing codes which are preset in a typewriter carrying a reader. In other words, by setting a tab mechanism in such a manner that the tab-setting and tab-clearing functions of the printing mechanism will be operated by reader's reading the aforesaid tab codes, a tab programming can easily be made adaptable to nearly any accounting system.

FIG. 1 shows a plan view of a sample embodiment of a program tape to help facilitate explanation of the captioned invention.

FIG. 2 shows a perspective view partly cut away, of a sample embodiment of a tab control unit of a typewriter according to this invention.

FIG. 3 shows a partial end view of what is shown in FIG. 2 of said control unit.

In FIG. 1, 1 represents a conventional punch tape and an example of code punch for describing the present invention, both of which are to be applied on a typewriter carrying a reader device, while 2, 3, 4 and 5 represents respectively, a carrier return and line feed code, a tab-clearing code a space code and a tab-setting code. Supposing the punch tape 1 is set on a reader, the tab mechanism of a typewriter shifts to a tab-clearing side as the reader reads total tab-clearing code 3, and when, in the next step, the printing unit of the typewriter returns and advances a line as the reader reads a carrier return and line feed code 2, all the tab stops are reset. Likewise, as said reader reads subsequent codes in the sequential order thereof, necessary space be taken by the printing unit and new tab stops be set by the operation of the tab mechanism. By continuing the like operation in accordance with the codes contained in the punch tape 1, the tab mechanism sets at the desired positions, the necessary number of tab stops only. According to this invention, therefore, tab-setting of a typewriter can be arbitrarily performed by providing a generally used punch tape with a desired program of one's choice, which renders itself applicable particularly to a control of tab functions on the receiver of a long distance data transmission. Control of electric circuits by means of a perforated tape is shown in U.S. Patent No. 1,930,252.

The tab control unit according to this invention is further illustrated in FIG. 2 and FIG. 3. In FIG. 2, 6 represents a tab control shaft carrying circumferential grooves 6*a* in each of which is wound a circular spring for tab stops as hereinafter described, each of said grooves carrying inside thereof indentions 6*b* and 6*c* for click-stops. The shaft 6, supported on shaft 13 carries, at its right end, radially disposed pins 7 and 8, one on top and one on the bottom side respectively. The pin 7 is further connected with a tab-setting electro plunger magnet 9 through a connecting link 11, and pin 8 is connected with tab-clearing electro plunger magnet 10 through a connecting link 12.

Under normal conditions, the shaft 6 is kept in balance by means of a resetting flat cantilever spring 16, said spring being inserted, at one end, in a forked end of an arm 14 integral with said shaft 6, and fixed, at the other end, in a suitable fixture 15.

As the tab-setting electro plunger magnet 9 operates, said shaft revolves counterclockwise (as viewed from the left side of FIG. 2) against the force of the cantilever spring 16, and clockwise when the tab-clearing electro plunger magnet 10 operates, said shaft being restorable to the original position by the force of said cantilever spring 16 as the aforesaid electro plunger magnets are deenergized. When electric current flows into the coil of a tab-setting electro plunger magnet such as 9 or 10, suction force arises between the core and the plunger shaft, whereupon said plunger shaft moves inwardly. In this instance, electro plunger magnets 9 and 10 are never energized at the same time and a plunger shaft in the tab-clearing plunger magnet 10 is made freely shiftable without resistance. After the predetermined function is performed by an electro plunger magnet as the printing unit reads tab-set code or tab-clear code, said electro plunger magnet is restored to its original position under the force of a spring 16.

The circumferential grooves 6*a* are as many as the corresponding printing columns of a typewriter, each said groove being fitted with a circular spring 17. The circular spring 17 carries an extension 17*a* engageable with click-stop indentions, either 6*b* or 6*c*, both ends 17*b* and 17*c* of said spring 17 being bent radially in relation to the axis of the shaft 6, (FIG. 3). Spaced from but parallel with said shaft 6 are bridged guide shafts 18 and 19 which are mounted with a tab-stopping member 20 slidable in the direction of the arrow in synchronization with the movement of the printing carriage. The tab-stopping member 20 has faces 20*a* and 20*b* which respectively butt against the ends of 17*b* and 17*c* of the spring 17, a tab-stopping extension 20*c* and a slant face 20*d* for resetting the spring 17. The punched tape merely has to do with connecting and disconnecting the source of current with the electro-magnets 9 and 10 at specified times to produce an interposition of a tab such as 17*c* in the path of member 20.

When the tab-setting electro plunger magnet 9 is energized by means of a "tab set" code 5, a pin 7 secured on the shaft 6 is pulled, causing the shaft 6 and the associated tab-stopping circular spring 17 to revolve counterclockwise (as viewed from the left of FIG. 2) against the force of resetting cantilever spring 16, until the end 17*b* of the spring 17 strikes against the face 20*a* of the aforesaid tab-stopping member 20 and thereby stops the motion of the spring 17. The shaft 6, however, further revolves causing an extension 17*a* of said spring 17 to shift from a click stop indention 6*c* to the like indention 6*b* (FIG. 3), when the rotating motion of said shaft 6 is stopped.

The shaft 6 thus rotated is restored to the original position by force of resetting cantilever spring 16 when electroplunger magnet 9 is deenergized. The returning movement of the shaft 6 simultaneously causes the circular spring 17 to return to a tab set position as shown in dotted line in FIG. 3. Therefore, the tab-stopping member 20 slides towards the arrow direction as shown in FIG. 2, until the end portion 17*c* of the above-described spring 17 strikes against the extension 20*c* of the member 20, when the sliding movement is stopped to perform a "tab-stop" function.

In order to return the spring 17 already set in a tab-set position to the original position, a tab-clearing electro plunger magnet 10 must be energized by means of a "tab-clear" code 2, which causes a pin 8 secured on the shaft 6 to be pulled. As the shaft 6 revolves against the force of resetting cantilever spring 16, in a clockwise direction (as viewed from the left side of FIG. 2), the extension 17*a* of said spring 17 shifts from a click-stop indention 6*b* to the like indention 6*c* (FIG. 3), because the end portion 17*c* of the spring 17 is in contact with the lower face 20*b* of the tab-stopping member 20 when the tab is in a "set" position, which prevents revolution of the spring 17 with the shaft 6. By moving said tab-stopping member 20 in the opposite direction from the arrow (or by causing the printing unit of a typewriter to return and advance a line) while keeping the tab-clearing electro magnet 10 energized, slant face 20*d* of tab-stopping member 20 is caused to hit against the spring 17, which thereby makes simultaneous resetting of the springs 17 also possible. The shaft 6 supporting the spring 17 returns to the original position by force of resetting cantilever spring 16 when the plunger magnet 10 is deenergized. It is evident from the above description that the tab-setting and tab-clearing functions of a typewriter can be made much easier by using codes for operating tab controlling plunger magnets.

Having fully described my invention, what I claim as new and desire to receive by Letters Patent is:

1. In a tab programming control system for a typewriter or the like, the combination of a grooved oscillatable tab control shaft, a plurality of grooves circumferentially arranged on said grooved shaft, a circular spring rotatably arranged in each groove, a pair of radially outwardly disposed tabs on each spring, a radially disposed inwardly bent portion in each circular spring, a pair of indentions in each groove to receive said inwardly bent portion of the circular spring in each groove to frictionally control circumferential movement of said circular spring in its groove, cantilever, spring means for holding said grooved shaft in a neutral balanced position, a spring support on said shaft for said spring, electro magnetic means for oscillating said grooved shaft to one side or the other of said neutral position, said electro magnetic means including two electric magnets, pins on said grooved shaft, a link connecting each pin to a magnet, a perforated tape coded for tab-setting and tab-clearing functions, and effective to control activation and deactivation of said electro magnetic means in response to the location of the perforations in the coded tape, tab-stopping means mounted to move back and forth in a path parallel and adjacent to said grooved shaft in synchronization with a typewriter carriage, rods parallel to said grooved shaft for supporting said tab-stopping means, two stop surfaces on said tab-stopping means, each effective to engage a tab on a circular spring and position the same circumferentially in relation to said grooved shaft, one of said surfaces being disposed on the end of a projection on said tab-stopping means, and said tab-stopping means comprising a second projection effective to engage one of said projecting tabs on a circular spring to arrest longitudinal movement of said tab-stopping means.

References Cited

UNITED STATES PATENTS

| | | | |
|---|---|---|---|
| 1,082,033 | 12/1913 | Lockwood | 197—179 |
| 1,508,911 | 9/1924 | Aichele | 197—70 |
| 1,930,252 | 10/1933 | Reynolds | 197—176 X |
| 2,581,227 | 1/1952 | Ascoli | 197—179 |
| 2,860,759 | 11/1958 | Clark | 197—179 |
| 2,936,871 | 5/1960 | Cummins | 197—179 |
| 3,283,872 | 11/1966 | Frechette | 197—179 X |
| 3,294,213 | 12/1966 | Jonsson | 197—179 |
| 3,333,669 | 8/1967 | Schaefer | 197—176 X |
| 3,346,088 | 10/1967 | Cralle et al. | 197—84 |

ROBERT E. PULFREY, *Primary Examiner.*

E. T. WRIGHT, Jr., *Assistant Examiner.*

U.S. Cl. X.R.

197—20, 70